(12) United States Patent
Chen et al.

(10) Patent No.: US 10,208,842 B2
(45) Date of Patent: Feb. 19, 2019

(54) LINKAGE MECHANISM

(71) Applicants: Pai-Feng Chen, Taipei (TW); Mao-Da Chen, Taipei (TW); Chih-Hsueh Tsai, Taipei (TW)

(72) Inventors: Pai-Feng Chen, Taipei (TW); Mao-Da Chen, Taipei (TW); Chih-Hsueh Tsai, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 0 days.

(21) Appl. No.: 15/693,420

(22) Filed: Aug. 31, 2017

(65) Prior Publication Data

US 2018/0073613 A1     Mar. 15, 2018

Related U.S. Application Data

(60) Provisional application No. 62/383,597, filed on Sep. 6, 2016.

(51) Int. Cl.
| | |
|---|---|
| *F16H 25/08* | (2006.01) |
| *F16H 25/16* | (2006.01) |
| *F16H 25/18* | (2006.01) |
| *F16H 19/00* | (2006.01) |
| *G06F 1/16* | (2006.01) |

(52) U.S. Cl.
CPC .......... *F16H 25/18* (2013.01); *F16H 19/001* (2013.01); *F16H 25/08* (2013.01); *G06F 1/1681* (2013.01)

(58) Field of Classification Search
CPC ...... G06F 1/1681; F16H 25/18; F16H 19/001; F16H 25/08; E05Y 2201/71; E05Y 2201/718
See application file for complete search history.

(56) References Cited

U.S. PATENT DOCUMENTS

| | | | |
|---|---|---|---|
| 2006/0238970 A1* | 10/2006 | Ukonaho | H04M 1/022 361/679.01 |
| 2009/0013500 A1* | 1/2009 | Ueyama | G06F 1/1616 16/354 |
| 2016/0329174 A1 | 11/2016 | Chen et al. | |

(Continued)

FOREIGN PATENT DOCUMENTS

| | | |
|---|---|---|
| CN | 1280374 | 1/2001 |
| CN | 1831705 | 9/2006 |

(Continued)

OTHER PUBLICATIONS

"Office Action of Taiwan Counterpart Application," dated Mar. 6, 2018, p. 1-p. 8, in which the listed references were cited.

*Primary Examiner* — Jake Cook
(74) *Attorney, Agent, or Firm* — JCIPRNET

(57) ABSTRACT

A linkage mechanism includes a pivot assembly, a gear assembly, and a linkage assembly. The pivot assembly pivots around a first rotation axis. The gear assembly is pivoted with the pivot assembly and moves in conjunction with the pivot assembly. The gear assembly includes a cam, and the cam pivots around a second rotation axis. The second rotation axis is not parallel to the first rotation axis. The linkage assembly is disposed at a side of the gear assembly and contacts the cam. When the pivot assembly drives the gear assembly to pivot, the linkage assembly abuts against the cam to produce a relative movement with the cam.

10 Claims, 3 Drawing Sheets

(56) References Cited

U.S. PATENT DOCUMENTS

2017/0226969 A1* 8/2017 Weis ................. F02M 26/67
2017/0235337 A1* 8/2017 Vic ..................... E05D 3/12
                                                361/679.55

FOREIGN PATENT DOCUMENTS

| JP | 2011112150 | 6/2011 |
| TW | 292371 | 12/1996 |
| TW | M492599 | 12/2014 |
| TW | M504981 | 7/2015 |

* cited by examiner

LINKAGE MECHANISM

CROSS-REFERENCE TO RELATED APPLICATION

This application claims the priority benefit of U.S. provisional application Ser. No. 62/383,597, filed on Sep. 6, 2016. The entirety of the above-mentioned patent application is hereby incorporated by reference herein and made a part of this specification.

BACKGROUND OF THE INVENTION

Field of the Invention

The invention relates to a linkage mechanism and particularly relates to a linkage mechanism that is adapted for an electronic device and has different rotation axes.

Description of Related Art

Generally speaking, a notebook computer consists of an upper body having a display screen and a lower body having a host system and/or a keyboard, and the upper body and the lower body are pivoted to each other by a hinge structure. However, since the conventional keyboard is positioned at the same height in both the use state and the non-use state, the overall thickness of the notebook computer cannot be reduced. Therefore, in order to reduce the overall thickness of the notebook computer to facilitate carrying, the existent hinge is designed to adopt the method of axial rotation, in which a hinge cap is rotated to drive a sleeve that has an oblique guiding groove, so that a linking member slidably disposed in the guiding groove of the sleeve may engage in a back-and-forth transverse motion. In this way, by following the back-and-forth transverse motion of the linking member, the keyboard connected to the linkage assembly is positioned at different heights in the use state and the non-use state respectively. However, such design of the oblique guiding groove is restricted by the available space of the notebook computer in the horizontal direction, and the oblique guiding groove needs to be formed by machine processing. Therefore, it is easy for process variation to occur, which in turn results in the problem of a stroke tolerance that is too wide.

SUMMARY OF THE INVENTION

The invention provides a linkage mechanism, in which a linkage assembly abuts against a cam to produce a relative movement with the cam, thereby resulting in a displacement of a base that is connected to the linkage assembly and carries a keyboard.

The linkage mechanism of the invention includes a pivot assembly, a gear assembly, and a linkage assembly. The pivot assembly pivots around a first rotation axis. The gear assembly is pivoted with the pivot assembly and moves in conjunction with the pivot assembly. The gear assembly includes a cam pivoting around a second rotation axis, wherein the second rotation axis is not parallel to the first rotation axis. The linkage assembly is disposed at a side of the gear assembly and contacts the cam. When the pivot assembly drives the gear assembly to pivot, the linkage assembly abuts against the cam to produce a relative movement with the cam.

In an embodiment of the invention, the pivot assembly includes a hinge cap and a shaft. The hinge cap and the shaft are assembled to each other, and the gear assembly is sleeved on the shaft.

In an embodiment of the invention, the pivot assembly further includes a fixing member. The fixing member is mounted on the hinge cap and disposed parallel to the shaft.

In an embodiment of the invention, the gear mechanism further includes a first gear, a second gear, and a third gear. The first gear is sleeved on the pivot assembly and pivots around the first rotation axis. The second gear engages with the first gear and pivots around the second rotation axis. The third gear engages with the second gear and pivots around the second rotation axis. The second gear is positioned between the first gear and the third gear, and the cam is sleeved on the third gear and rotates with the third gear coaxially.

In an embodiment of the invention, the linkage assembly includes a linkage, a position-limiting member, and an elastic member. The linkage includes a linkage portion and a protrusion portion connected to the linkage portion. A first extension direction of the linkage portion is perpendicular to a second extension direction of the protrusion portion, and the linkage portion abuts against the cam to produce the relative movement with the cam. The position-limiting member has an accommodating region, and the protrusion portion of the linkage is positioned in the accommodating region. The position-limiting member limits a displacement of the linkage in a direction that is parallel to the first extension direction of the linkage portion, and a gap exists between the position-limiting member and the linkage portion of the linkage. The elastic member is disposed inside the gap and contacts the linkage portion of the linkage and the position-limiting member. Herein, the elastic member is elastically deformed by the relative movement produced between the linkage portion of the linkage and the cam.

In an embodiment of the invention, the linkage portion of the linkage has an interference bump, and an outer contour of the cam contacts and interferes with the interference bump.

In an embodiment of the invention, the cam includes a tangent cam or a triangular cam.

In an embodiment of the invention, when the pivot assembly drives the gear assembly to pivot to a first state, the linkage assembly abuts against the cam to move from an original position to a predetermined position horizontally.

In an embodiment of the invention, when the pivot assembly drives the gear assembly to pivot from the first state to a second state, the linkage assembly resists the cam that abuts against the linkage assembly to be maintained in the predetermined position.

In an embodiment of the invention, when the pivot assembly drives the gear assembly to pivot from the second state to a third state, the linkage assembly abuts against the cam to move from the predetermined position to the original position horizontally.

Based on the above, in the linking mechanism of the invention, the pivot assembly and the cam of the gear assembly have rotation axes that are not parallel. As a result, when the pivot assembly drives the gear assembly to pivot, the linkage assembly abuts against the cam to produce the relative movement with the cam, thereby resulting in the displacement of the base that is connected to the linkage assembly and carries the keyboard. While the conventional mechanism produces a displacement of the keyboard by means of axial rotation so that the keyboard is positioned at different heights, the linkage mechanism of the invention, by comparison, produces a displacement of the base that is connected to the linkage assembly and carries the keyboard by means of radial rotation.

To make the above features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

Figure 1A:
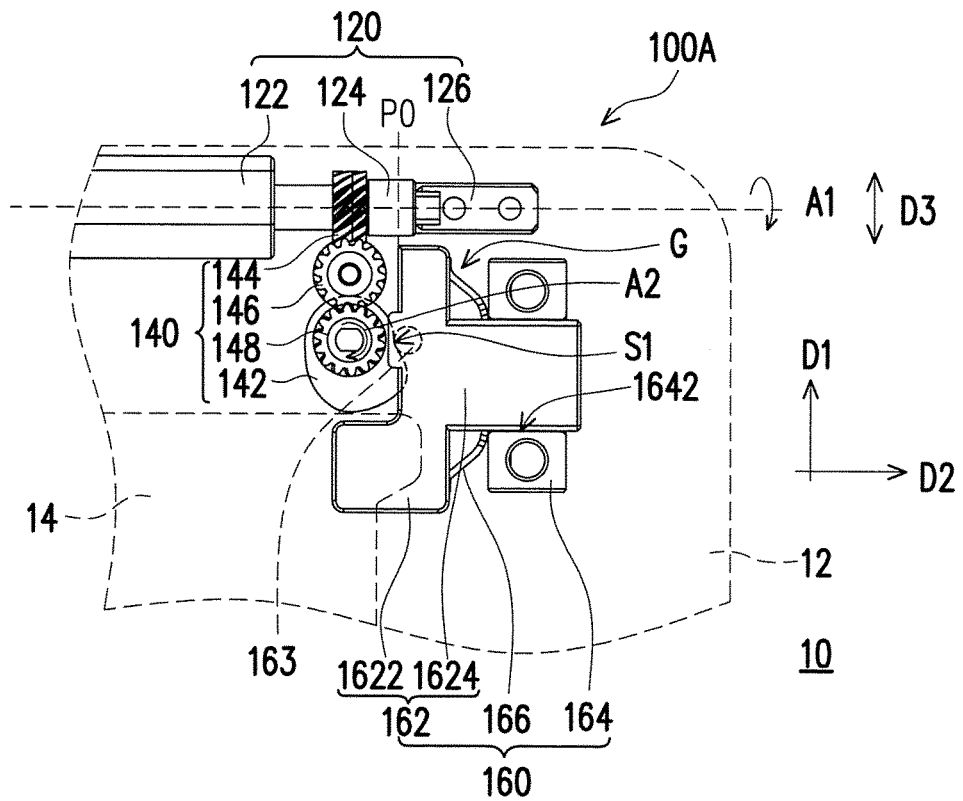
FIG. 1A is a schematic top view of a linkage mechanism according to an embodiment of the invention.
Figure 1B:
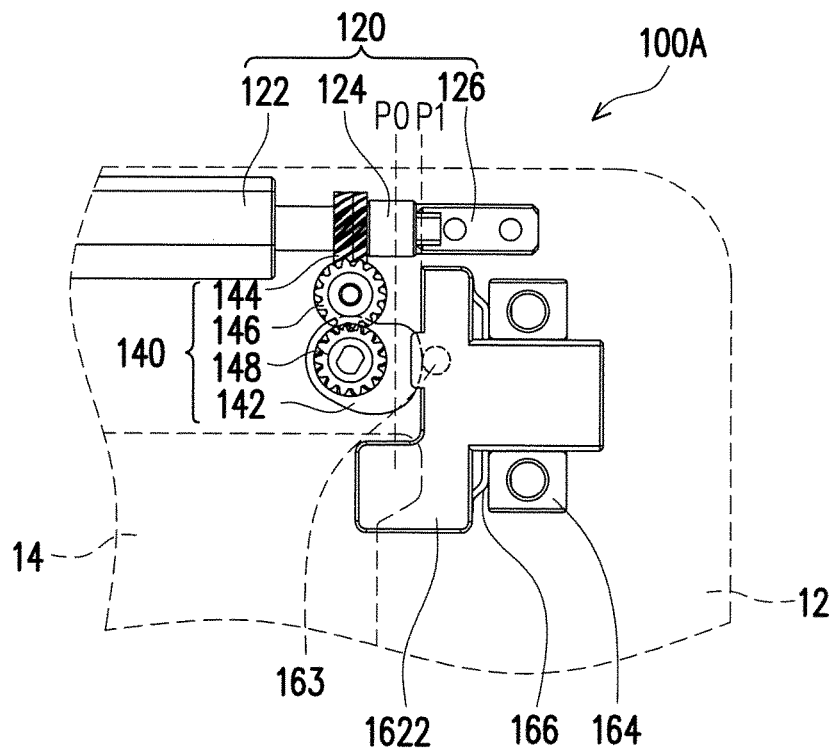
FIG. 1B to FIG. 1D are schematic views of the linkage mechanism of FIG. 1A in operation.
Figure 1C:
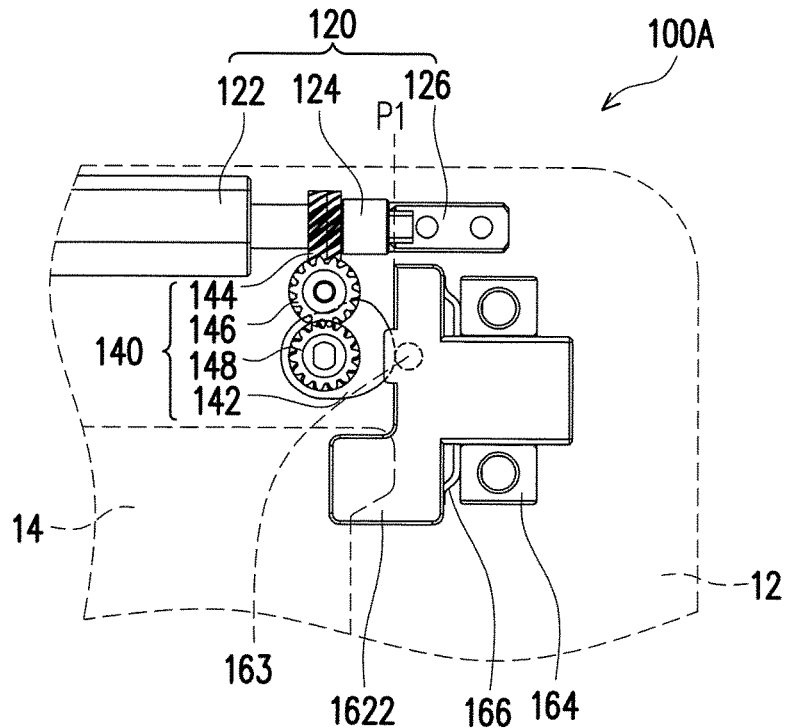
Figure 1D:
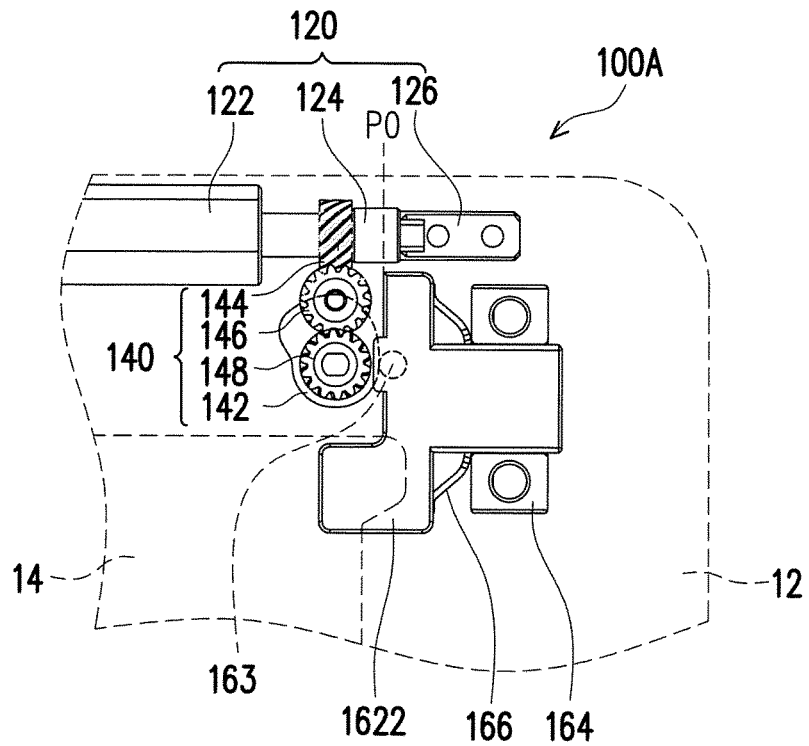
Figure 2A:
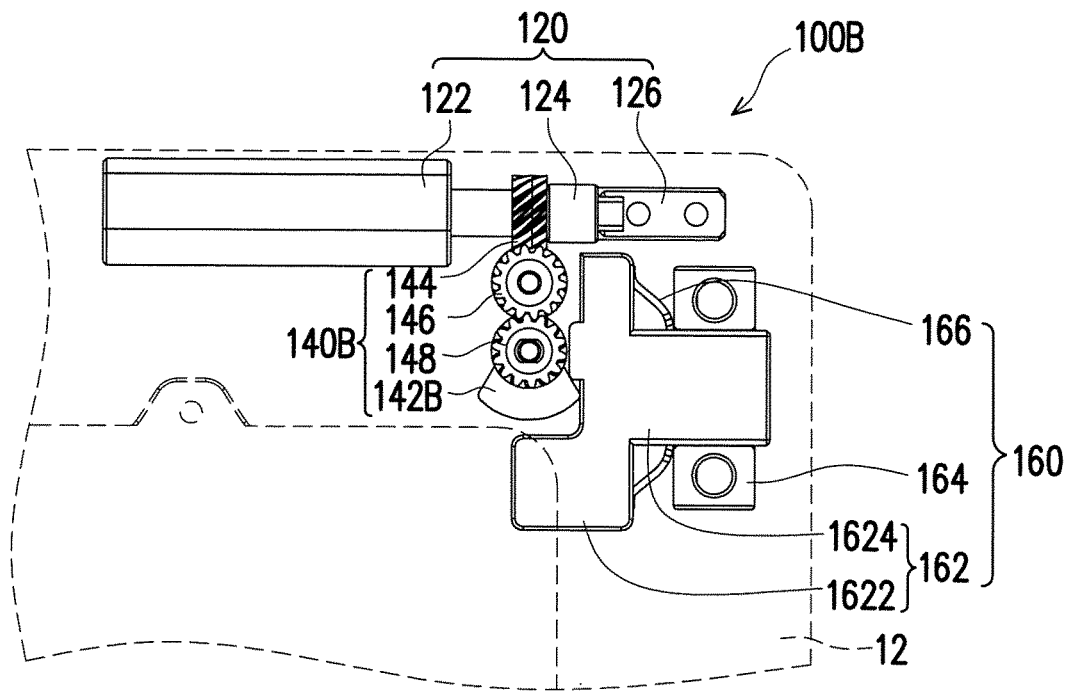
FIG. 2A is a schematic top view of a linkage mechanism according to another embodiment of the invention.
Figure 2B:
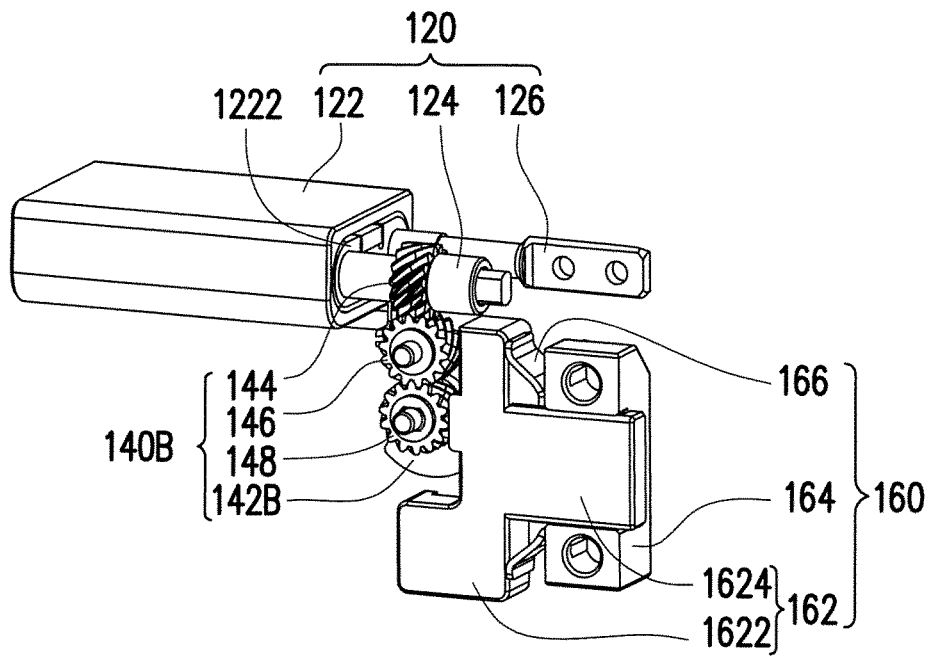
FIG. 2B is a schematic three-dimensional view of the linkage mechanism of FIG. 2A.

FIG. 1A is a schematic top view of a linkage mechanism according to an embodiment of the invention. FIG. 1B to FIG. 1D are schematic views of the linkage mechanism of FIG. 1A in operation. FIG. 2A is a schematic top view of a linkage mechanism according to another embodiment of the invention. FIG. 2B is a schematic three-dimensional view of the linkage mechanism of FIG. 2A.

With reference to FIG. 1A first, in this embodiment, a linkage mechanism 100A includes a pivot assembly 120, a gear assembly 140, and a linkage assembly 160. The pivot assembly 120 pivots around a first rotation axis A1 so that a first body (not shown) may be opened relative to a second body 12 at an angle or may be closed relative to the second body 12. The gear assembly 140 is pivoted with the pivot assembly 120 and moves in conjunction with the pivot assembly 120. The gear assembly 140 includes a cam 142, and the cam 142 pivots around a second rotation axis A2, wherein the second rotation axis A2 is not parallel to the first rotation axis A1. The linkage assembly 160 is disposed at a side Si of the gear assembly 140 and contacts the cam 142.

Specifically, the linkage mechanism 100A of this embodiment is, for example, pivoted between the first body (not shown) and the second body 12 of an electronic device 10 (such as a notebook computer). The first body is, for example, a liquid crystal display (LCD), and the second body 12 is, for example, a host. By the pivoting movement performed by the linkage mechanism 100A, a user may pivot the first body relative to the second body 12 to open or close the electronic device 10.

As shown in FIG. 1A, in this embodiment, the pivot assembly 120 includes a hinge cap 122 and a shaft 124. The hinge cap 122 and the shaft 124 are assembled to each other, and the hinge cap 122 and the shaft 124 pivot around the first rotation axis A1 synchronously. Furthermore, in this embodiment, the pivot assembly 120 may further include a fixing member 126, and the fixing member 126 is mounted on the hinge cap 122 and parallel to the shaft 124. In other words, the fixing member 126 and the shaft 124 are positioned on the same side of the hinge cap 122, and also pivot around the first rotation axis A1 with the hinge cap 122 synchronously. Herein, the hinge cap 122 may be pivoted with the first body (not shown), and the fixing member 126, for example, is fixed on the second body 12 by screwing or bolting. Besides, in other embodiments (please refer to FIG. 2B), the hinge cap 122 of the pivot assembly 120 may include a fixing plate 1222. The fixing plate 1222 is positioned on the side of the hinge cap 122 where the shaft 124 and the fixing member 126 are disposed, and is positioned between the hinge cap 122 and the shaft 124 and between the hinge cap 122 and the fixing member 126, so that the fixing plate 1222 abuts against peripheries of the fixing member 126 and the shaft 124, causing the fixing member 126 and the shaft 124 to be firmly wedged to the same side of the hinge cap 122 respectively. However, in other embodiments, the hinge cap 122 and the shaft 124 and the fixing member 126 may also be an integrally formed structure, and the invention is not limited thereto.

Furthermore, in this embodiment, the gear assembly 140 further includes a first gear 144, a second gear 146, and a third gear 148. The first gear 144 is sleeved on the pivot assembly 120 and pivots around the first rotation axis A1. The second gear 146 engages with the first gear 144 and pivots around the second rotation axis A2. The third gear 148 engages with the second gear 146 and pivots around the second rotation axis A2. The second gear 146 is positioned between the first gear 144 and the third gear 148, and the cam 142 is sleeved on the third gear 148 and rotates with the third gear 148 coaxially. Specifically, in the gear assembly 140 of this embodiment, the first gear 144, the second gear 146, and the third gear 148 engage with one another, and the cam 142 is sleeved on the third gear 148. The first gear 144 is sleeved on the shaft 124 of the pivot assembly 120, and pivots with the shaft 124 synchronously and around the same rotation axis. The second gear 146, the third gear 148, and the cam 142 have the same rotation axis, which is not parallel to the rotation axis of the first gear 142. The rotation direction of the second gear 146 is opposite to the rotation direction of the third gear 148, and the rotation direction of the cam 142 is the same as the rotation direction of the third gear 148. Herein, the cam 142 is, for example, a tangent cam, and the first gear 144, the second gear 146 and the third gear 148 are, for example, helical gears, but the invention is not limited thereto. The second gear 146 may be viewed as an idle gear and the third gear 148 may be viewed as a driven gear, and the second gear 146, by the transmission of the first gear 144, drives the third gear 148 to rotate while the third gear 148 drives the cam 142 to rotate coaxially and synchronously. It should be noted that this embodiment does not limit the type of the cam 142. In other embodiments (please refer to FIG. 2A), a cam 142B of a gear assembly 140B in a linkage mechanism 100B may also be a triangular cam.

Besides, in this embodiment, the linkage assembly 160 includes a linkage 162, a position-limiting member 164, and an elastic member 166. The linkage 162 includes a linkage portion 1622 and a protrusion portion 1624 connected to the linkage portion 1622. A first extension direction D1 of the linkage portion 1622 is perpendicular to a second extension direction D2 of the protrusion portion 1624. The position-limiting member 164 has an accommodating region 1642, and the protrusion portion 1624 of the linkage 162 is positioned in the accommodating region 1642 of the position-limiting member 164. Herein, the position-limiting member 164 limits a displacement of the linkage 162 in a direction D3 that is parallel to the first extension direction D1 of the linkage portion 1622, and a gap G exists between the position-limiting member 164 and the linkage portion 1622 of the linkage 162. The elastic member 166 is disposed inside the gap G and contacts the linkage portion 1622 of the linkage 162 and the position-limiting member 164. Herein, the elastic member 166, besides serving as a buffering component between the linkage portion 1622 and the position-limiting member 164, may also serve as a stopping component to limit a displacement of the linkage portion 1622 in a parallel direction perpendicular to the direction D3. In this embodiment, the elastic member 166 is embodied to be a spring leaf, but in other embodiments not shown here, the elastic member may also be a compression spring or other elastic components with good elasticity. The invention is not limited thereto.

In the following, the operation of the linkage mechanism is exemplified by the linkage mechanism 100A of FIG. 1A. With reference to FIG. 1A and FIG. 1B simultaneously, when the pivot assembly 120 drives the gear assembly 140 to pivot to a first state (as shown in FIG. 1B), the linkage assembly 160 abuts against the cam 142 to move from an original position P0 to a predetermined position P1 horizontally. Specifically, when the pivot assembly 120 drives the gear assembly 140 to pivot to the first state (as shown in FIG. 1B), the first body (not shown) may be opened relative to the second body 12 at 90 degrees, and an outer contour of the cam 142 contacts and interferes with an interference bump 163 of the linkage portion 1622, so that the linkage assembly 160 abuts against the cam 142 to produce a relative movement with the cam 142. In other words, the original position P0 is moved to the predetermined position P1 horizontally. At this time, an elastic force of the elastic member 166 is smaller than a pushing force of the cam 142 abutting against the linkage assembly 160, and the elastic member 166 is elastically deformed by the relative movement produced between the linkage portion 1622 and the cam 142. A base 14 carrying a keyboard (not shown) and connected to the linkage assembly 160 has a displacement by the relative movement between the linkage assembly 160 and the cam 142, so that the keyboard is raised to the height of the usable state. Herein, the original position P0 and the predetermined position P1 are, for example, 2.5 millimeters apart from each other.

Then, with reference to FIG. 1B and FIG. 1C simultaneously, when the pivot assembly 120 drives the gear assembly 140 to pivot from the first state (as shown in FIG. 1B) to a second state (as shown in FIG. 1C), the linkage assembly 160 resists the cam 142 that abuts against the linking assembly 160 to be maintained in the predetermined position P1. Specifically, when the pivot assembly 120 drives the gear assembly 140 to pivot to the second state (as shown in FIG. 1C), the first body (not shown) may be opened relative to the second body 12 at 180 degrees, and an elastic force of the elastic member 166 is approximately equal to a pushing force of the cam 142 abutting against the linkage assembly 160 so that the linkage assembly 160 is maintained in the predetermined position P1. At this time, the keyboard (not shown) on the base 14 is maintained at the height of the usable state.

Lastly, with reference to FIG. 1C and FIG. 1D simultaneously, when the pivot assembly 120 drives the gear assembly 140 to pivot from the second state (as shown in FIG. 1C) to a third state (as shown in FIG. 1D), the linkage assembly 160 abuts against the cam 142 to move from the predetermined position P1 to the original position P0 horizontally. Specifically, when the pivot assembly 120 drives the gear assembly 140 to pivot to the third state (as shown in FIG. 1D), the first body (not shown) may be opened relative to the second body 12 at 360 degrees. At this time, the distance between an axle center and the outer contour of the cam 142 contacting the linkage portion 1622 becomes smaller, and an elastic force of the elastic member 166 is greater than a pushing force of the cam 142 abutting against the linkage assembly 160. As a result, the linkage assembly 160 moves from the predetermined position P1 to the original position P0 horizontally. At this time, the elastic member 166 returns to the original state, and the keyboard (not shown) on the base 14 is lowered from the height of the usable state to the height of the non-use state.

It should be noted that in this embodiment, during the process when the gear assembly 140 is pivoted from the first state (as shown in FIG. 1B) to the third state (as shown in FIG. 1D) by the pivot assembly 120 (i.e. the first body (not shown) pivots relative to the second body 12 from 0 to 360 degrees), the second gear 146 is, for example, rotated clockwise around the axle center, and the third gear 148 and the cam 142 are, for example, rotated counterclockwise around the axle center. During the process when the gear assembly 140 is pivoted from the third state (as shown in FIG. 1D) back to the first state (as shown in FIG. 1B) by the pivot assembly 120 (i.e. the first body pivots relative to the second body 12 from 360 to 0 degrees), the second gear 146 is, for example, rotated counterclockwise around the axle center, and the third gear 148 and the cam 142 are, for example, rotated clockwise around the axle center. In other embodiments not shown here, during the process when the gear assembly is pivoted by the pivot assembly, the rotation directions of the first gear, the second gear, the third gear, and the cam may also be adjusted in accordance with actual design requirements. The invention is not limited thereto.

In addition, although the cams 142 and 142B in the foregoing embodiments of the invention are exemplified by a tangent cam and a triangular cam respectively, in other embodiment not shown here, the shape of the cam may also assume other appropriate outer contours in accordance with design requirements of the actual product or the displacement path required for the movement of the components. As long as the linkage assembly, by abutting against the cam, produces a relative movement with respect to the outer contour of the cam, it still falls within the protection scope of the invention. Besides, in this embodiment, the number of teeth, the size of gears, and the placement angle of the first gear 144, the second gear 146, and the third gear 148 may also be changed or adjusted in accordance with actual design requirements. The invention is not limited thereto.

In summary, in the linking mechanism of the invention, the pivot assembly and the cam of the gear assembly have different rotation axes. As a result, when the pivot assembly drives the gear assembly to pivot, the linkage assembly abuts against the cam to produce the relative movement with the cam, thereby resulting in the displacement of the base that is connected to the linkage assembly and carries the keyboard. While the conventional mechanism produces a displacement of the keyboard by means of axial rotation so that the keyboard is positioned at different heights, the linkage mechanism of the invention, by comparison, produces a displacement of the base that is connected to the linkage assembly and carries the keyboard by means of radial rotation.

Although the embodiments are already disclosed as above, these embodiments should not be construed as limitations on the scope of the invention. It will be apparent to those skilled in the art that various modifications and variations can be made to the disclosed embodiments without departing from the scope or spirit of this invention. In view of the foregoing, it is intended that the invention covers modifications and variations provided that they fall within the scope of the following claims and their equivalents.

What is claimed is:

1. A linkage mechanism, comprising:
   a pivot assembly pivoting around a first rotation axis;
   a gear assembly pivoted with the pivot assembly and moving in conjunction with the pivot assembly, the gear assembly comprising a cam pivoting around a second rotation axis, wherein the second rotation axis is not parallel to the first rotation axis; and
   a linkage assembly disposed at a side of the gear assembly and contacting the cam, wherein when the pivot assembly drives the gear assembly to pivot, the linkage assembly abuts against the cam to produce a relative movement with the cam.

2. The linkage mechanism as recited in claim 1, wherein the pivot assembly comprises a hinge cap and a shaft, the hinge cap and the shaft are assembled to each other, and the gear assembly is sleeved on the shaft.

3. The linkage mechanism as recited in claim 2, wherein the pivot assembly further comprises a fixing member mounted on the hinge cap and disposed parallel to the shaft.

4. The linkage mechanism as recited in claim 1, wherein the gear assembly further comprises:
   a first gear sleeved on the pivot assembly and pivoting around the first rotation axis;
   a second gear engaging with the first gear and pivoting around the second rotation axis;
   a third gear engaging with the second gear and pivoting around the second rotation axis, wherein the second gear is positioned between the first gear and the third gear, and the cam is sleeved on the third gear and rotates with the third gear coaxially.

5. The linkage mechanism as recited in claim 1, wherein the linkage assembly comprises:
   a linkage comprising a linkage portion and a protrusion portion connected to the linkage portion, wherein a first extension direction of the linkage portion is perpendicular to a second extension direction of the protrusion portion, and the linkage portion abuts against the cam to produce the relative movement with the cam;
   a position-limiting member having an accommodating region, the protrusion portion of the linkage positioned in the accommodating region, wherein the position-limiting member limits a displacement of the linkage in a direction that is parallel to the first extension direction of the linkage portion, and a gap exists between the position-limiting member and the linkage portion of the linkage; and
   an elastic member disposed inside the gap and contacting the linkage portion of the linkage and the position-limiting member, wherein the elastic member is elastically deformed by the relative movement produced between the linkage portion of the linkage and the cam.

6. The linkage mechanism as recited in claim 5, wherein the linkage portion of the linkage has an interference bump, and an outer contour of the cam contacts and interferes with the interference bump.

7. The linkage mechanism as recited in claim 1, wherein the cam comprises a tangent cam or a triangular cam.

8. The linkage mechanism as recited in claim 1, wherein when the pivot assembly drives the gear assembly to pivot to a first state, the linkage assembly abuts against the cam to move from an original position to a predetermined position horizontally.

9. The linkage mechanism as recited in claim 8, wherein when the pivot assembly drives the gear assembly to pivot from the first state to a second state, the linkage assembly resists the cam that abuts against the linkage assembly to be maintained in the predetermined position.

10. The linkage mechanism as recited in claim 9, wherein when the pivot assembly drives the gear assembly to pivot from the second state to a third state, the linkage assembly abuts against the cam to move from the predetermined position to the original position horizontally.

* * * * *